United States Patent
Zipperle

(12) 
(10) Patent No.: US 6,705,663 B2
(45) Date of Patent: Mar. 16, 2004

(54) SUPPORTING FRAMEWORK OF A REAR COVER OF A REAR COMPARTMENT IN A BODYWORK

(75) Inventor: Siegfried Zipperle, Aidlingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/200,810

(22) Filed: Jul. 22, 2002

(65) Prior Publication Data

US 2003/0020300 A1 Jan. 30, 2003

(30) Foreign Application Priority Data

Jul. 30, 2001 (DE) .......................... 101 37 018

(51) Int. Cl.[7] ................................. B60J 7/20
(52) U.S. Cl. ............... 296/136.06; 296/107.08; 296/76
(58) Field of Search ............. 296/107.08, 136, 296/76, 146.12, 136.06

(56) References Cited

U.S. PATENT DOCUMENTS 5,823,606 A * 10/1998 Schenk et al. ......... 296/107.08

FOREIGN PATENT DOCUMENTS

| DE | 44 45 944 | 4/1996 |
|---|---|---|
| DE | 195 16 877 | 10/1996 |
| DE | 197 37 059 | 3/1999 |
| DE | 198 00 156 | 7/1999 |
| DE | 199 46 454 | 4/2000 |
| DE | 199 32 500 | 2/2001 |
| DE | 199 40 959 | 3/2001 |
| JP | 2001113953 | 4/2000 |
| JP | 2000211373 | 8/2000 |

OTHER PUBLICATIONS

Weissmueller et al., U.S. patent Publication No. 2002/0093218, published on Jul. 18, 2002.

* cited by examiner

*Primary Examiner*—Dennis H. Pedder
(74) *Attorney, Agent, or Firm*—Kenyon & Kenyon

(57) ABSTRACT

A supporting framework of a rear cover may be pivoted up about a front transverse axis and a rear transverse axis, of a rear compartment in a bodywork of a passenger vehicle having a fold-away roof, the rear compartment being used for accommodating a roof or roof part and luggage. Due to a special kinematic arrangement of the supporting framework, the rear cover executes a lifting movement before it pivots about the rear transverse axis.

4 Claims, 4 Drawing Sheets

SUPPORTING FRAMEWORK OF A REAR COVER OF A REAR COMPARTMENT IN A BODYWORK

FIELD OF THE INVENTION

The present invention relates to a supporting framework of a rear cover, which may be pivoted up about a front transverse axis and a rear transverse axis, of a rear compartment in a bodywork of a passenger vehicle having a fold-away roof or roof part, the rear compartment being used for accommodating a roof or roof part and luggage, having a frame which is U-shaped in plan view and has a central part orientated in the transverse direction and arranged on the rear of the bodywork, and U-limbs which may be pivoted about the rear transverse axis, and on the U-limbs, rear-cover supporting parts which may be pivoted about the front transverse axis.

BACKGROUND INFORMATION

A supporting framework is described in German Published Patent Application No. 195 16 877, which provides the possibility, firstly, of opening the rear cover by pivoting it about the rear transverse axis in order to deposit the fold-away roof part or roof in the compartment below the rear cover. Secondly, the rear cover may be pivoted up about the front transverse axis in order to load the rear compartment in the bodywork with luggage.

According to German Published Patent Application No. 195 16 877, the central part of the U-shaped frame is mounted directly on joints fixed on the bodywork, in the vicinity of the upper edge of a rear bumper of the bodywork, such that the central part may pivot about the rear pivot axis. This ensures that the U-shaped frame is secured in a structurally simple and stable manner. However, a certain limitation on the freedom of the bodywork design has to be accepted.

SUMMARY

It is an object of the present invention to provide a supporting framework which allows more extensive clearances in the configuration of the bodywork.

The above and other beneficial objects of the present invention are achieved by providing a supporting framework with a lifting/tilting guide which retains the frame and lifts up first when the rear flap is pivoted up about the rear transverse axis and during corresponding pivoting of the U-limbs.

The present invention is based on the general concept of changing the kinematic relations of the supporting framework when pivoting the rear flap about the rear transverse axis such that the rear flap executes an essentially translatory lifting movement causing the gap between the edge of the rear flap and adjacent, stationary parts of the bodywork to be widened. This produces more clearance which is available for the following pivoting movement and the adjacent, stationary bodywork does not have to be taken into consideration as an interfering contour during the tilting movement. Significantly greater freedom is therefore offered both with regard to the configuration of the rear flap and with regard to the configuration of the adjacent, stationary bodywork parts.

According to an exemplary embodiment of the present invention, the lifting/tilting guide may be configured as a four-bar linkage system having two hinge pins parallel to the transverse axes, on a stationary part of the bodywork, and two hinge pins parallel thereto, on a part fixed on the frame or on the frame, a first straight line passing, in axial view, through the hinge pins on the bodywork and a second straight line passing through the hinge pins on the frame forming an upwardly open angle, a first link being arranged between the upper hinge pins and a second link, which is shorter than the first link, being arranged between the lower hinge pins. It is possible for an adjusting assembly to be used to subject the frame to a torque with respect to the two hinge pins on the frame.

A hinge system of this type provides the possibility of an arrangement in which, in the initial or rest position of the frame, the hinge pins on the frame are arranged approximately perpendicularly one above the other and lower than the corresponding pins on the bodywork, and the links may accordingly execute a comparatively large pivoting lift without a considerable tilting movement of the frame, the frame then executing a significant lifting movement during the abovementioned pivoting lift. If, during the lifting/tilting movement, the adjusting assembly exerts, on the frame, a torque orientated in the pivoting direction of the links, the abovementioned lifting movement is inevitably executed, the lifting movement increasingly being combined with a certain pivoting movement, in which the two links execute a pivoting movement acting in the same direction until the lower link reaches a position in which the lower hinge pin on the bodywork and the two hinge pins on the frame are on a straight line, in axial view. On further actuation of the adjusting assembly, the links then pivot in an opposed manner to each other, with the consequence that hardly any further pivoting movement of the frame takes place and, instead, an increased tilting movement occurs.

To allow for the links to be arranged in a common plane and for the four-bar linkage system to be configured with a small width in the axial direction of the hinge pins, provision may be made for the upper link to be configured as an angled lever having a downwardly open angle opening or as a curved lever having a downwardly directed concave side. This enables the lower hinge pin on the frame to cross the connecting line between the upper hinge pin on the body and the upper hinge pin on the frame, in the manner desired for a distinctive tilting lift of the frame.

With regard to useful compartments which are as large as possible and are as free from interfering contours as possible in the rear compartment in the bodywork, the U-limbs of the frame have, in side view of the bodywork, an L-shape which may closely conform to the rear flap, which is L-shaped in side view of the bodywork.

The general concept of arranging essential structural parts of the supporting framework closely adjacent to the edge of the closed rear flap is realized here, with the result that, within the rear compartment below the U-limbs, readily useable compartments are still available in the vicinity of the side walls of the bodywork. For example, one or two golf bags orientated approximately in the direction of the transverse axis of the bodywork may be pushed into these compartments.

DETAILED DESCRIPTION

Figure 1A:
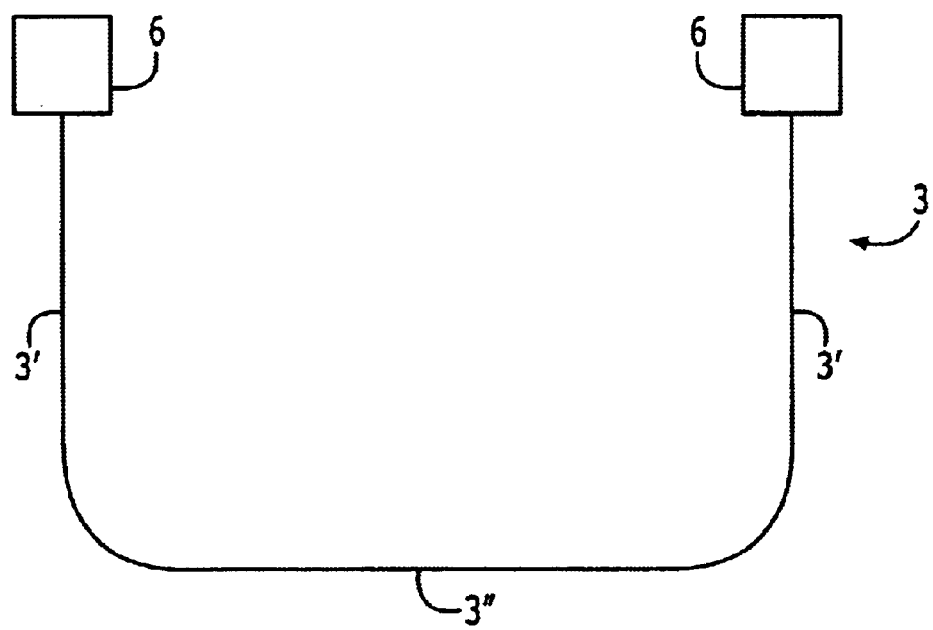
FIG. 1A is plan view of the U-shaped supporting framework of FIG. 1 shown only with the link systems, in schematic form.
Figure 1:
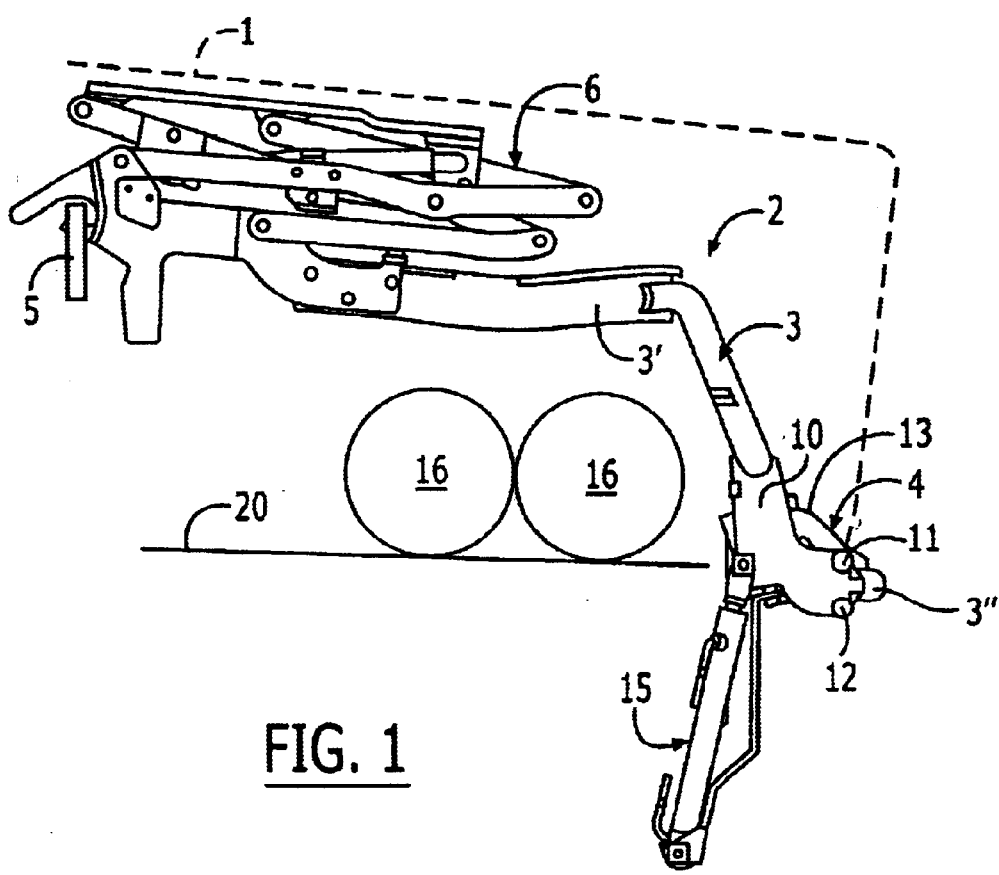
FIG. 1 is a side view of the supporting framework in a state when the rear cover is closed.
Figure 2:
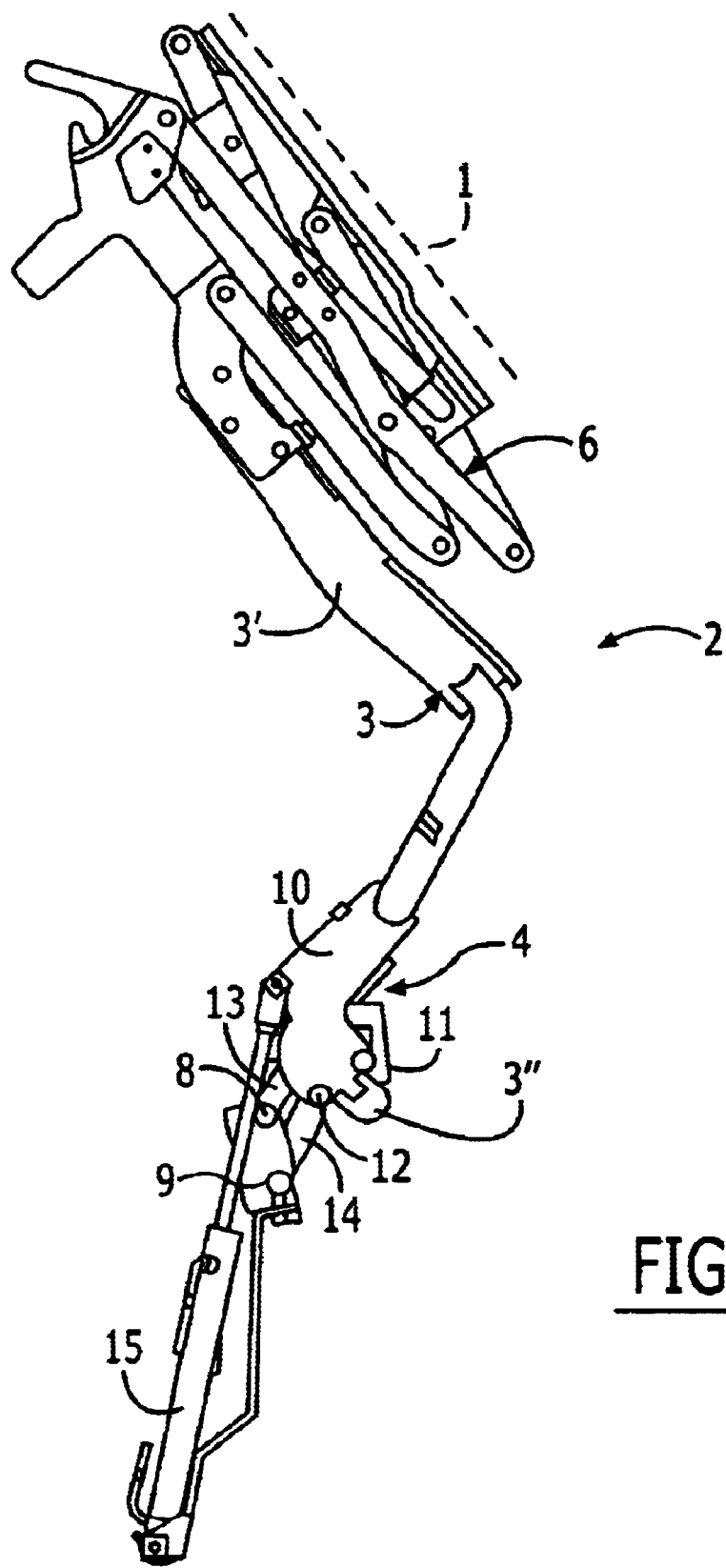
FIG. 2 is a side view, corresponding to FIG. 1, of the supporting framework when the rear cover is pivoted up about the rear transverse axis.
Figure 3:
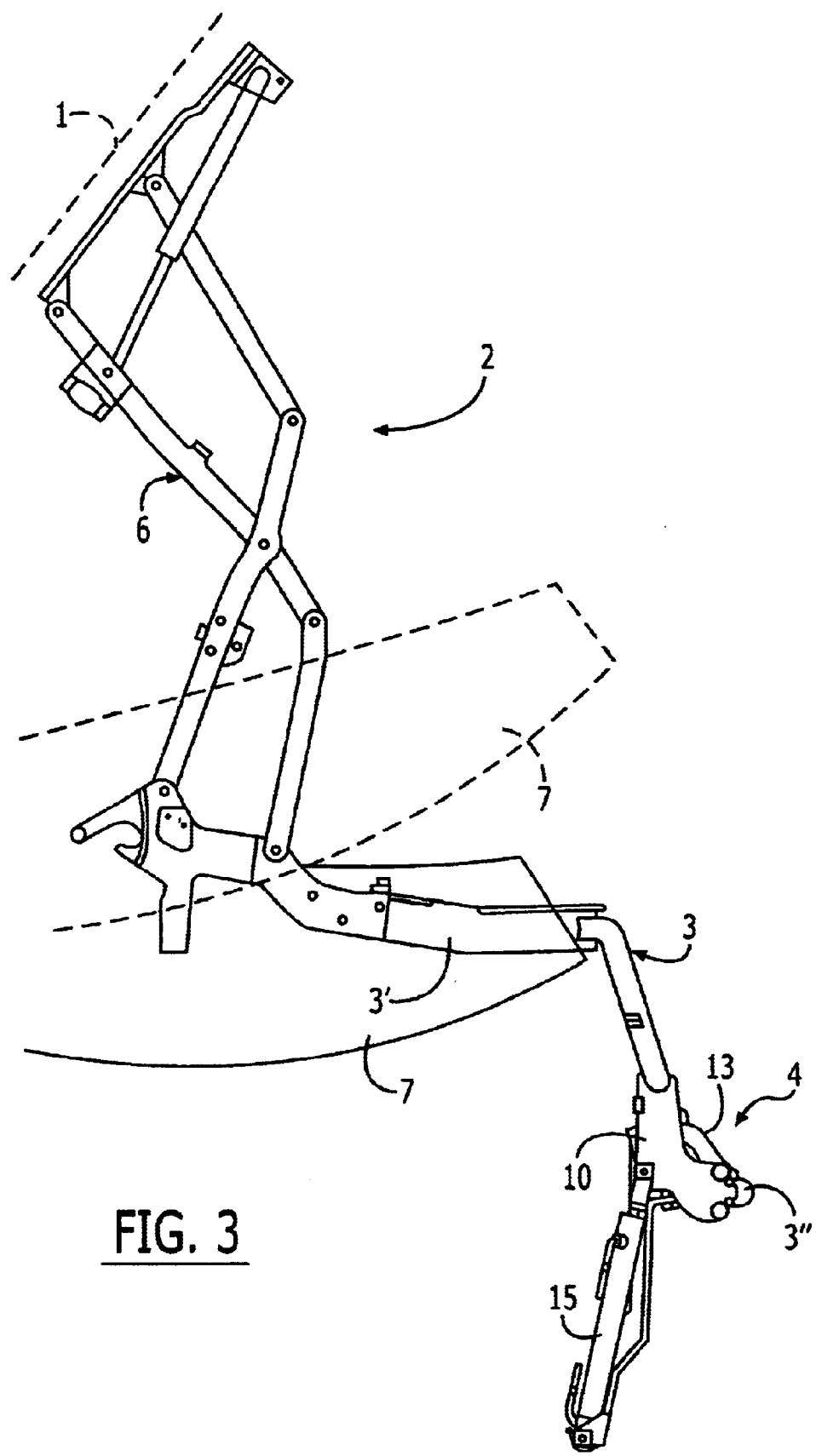
FIG. 3 is a further side view of the supporting framework when the rear cover is pivoted up about the front transverse axis.

According to FIGS. 1 to 3, a rear cover 1, which is illustrated in part and schematically by dashed lines, of a bodywork of a passenger vehicle having a fold-away roof is arranged on a supporting framework 2. The latter has a main structural part in the form of a frame 3 which is U-shaped in plan view (FIG. 1A) of the bodywork and the U-limbs 3' of which are configured, in side view of the bodywork, in an L-shaped manner similarly to the contour of the rear cover 1, which is likewise L-shaped in side view. These U-limbs 3' are connected to each other in a torsionally stiff manner via a central part 3" of the U-frame 3. Only a portion of the L-shaped cover 1 is shown in FIGS. 2 and 3 for clarity.

In the transitional region to the central part 3", lifting/tilting guides are arranged on the U-limbs 3', the guides configured as four-bar linkage systems 4 and at which the U-frame 3 may be pivoted up from the rest position illustrated in FIG. 1 into the position illustrated in FIG. 2 when catches 5 (illustrated in FIG. 1) are released, which catches may be used to fasten the ends of the U-limbs 3' which are remote from the central part 3" to parts 6 on the bodywork. In the position illustrated in FIG. 2, a roof or roof part 7 (cf. FIG. 3) may be deposited in a compartment 20 below the rear cover 1 or be moved out of this compartment 20.

Otherwise, scissors-like link systems 6 are arranged in each case on the U-limbs 3', the systems permitting a lifting/tilting movement of the rear cover 1 from the closed position illustrated in FIG. 1 into the open position illustrated in FIG. 3. In this position of the rear cover 1, the compartment 20 arranged underneath may be loaded with luggage. FIG. 1A is a plan view of the U-shaped frame 3 shown only with the link systems 6, in highly schematic form.

If previously the roof or roof part 7 of the vehicle has been deposited below the rear cover 1, the roof or roof part may optionally be pivoted from the storage position (illustrated by solid lines in FIG. 3) temporarily into the loading-assist position (illustrated by dashed lines), in order to be able to accommodate the luggage more easily below the deposited roof 7.

Each of the four-bar linkage systems 4 assigned in each case to one of the U-limbs 3' has two hinge pins 8 and 9 fixed on the bodywork and two hinge pins 11 and 12 which are fixed on the frame and are arranged on the frame 3 or on a fitting arrangement 10 connected fixedly thereto, the upper hinge pin 8 which is fixed on the bodywork being connected via a link 13 to the upper hinge pin 11 which is fixed on the frame, and the lower hinge pin 9 which is fixed on the bodywork being connected via a link 14 to the lower hinge pin 12 which is fixed on the frame.

In this case, the upper link 13 may be configured as a curved or angular link having a downwardly pointing angle opening or concave side.

A pneumatic or hydraulic adjusting cylinder 15 is arranged on at least one of the two four-bar linkage systems 4, between a point of articulation on the fitting arrangement 10, which point is remote from the hinge pins 11 and 12 fixed on the frame, and an abutment fixed on the bodywork, in order to be able to adjust the frame 3 between the positions illustrated in FIGS. 1 and 2.

Figure 4:
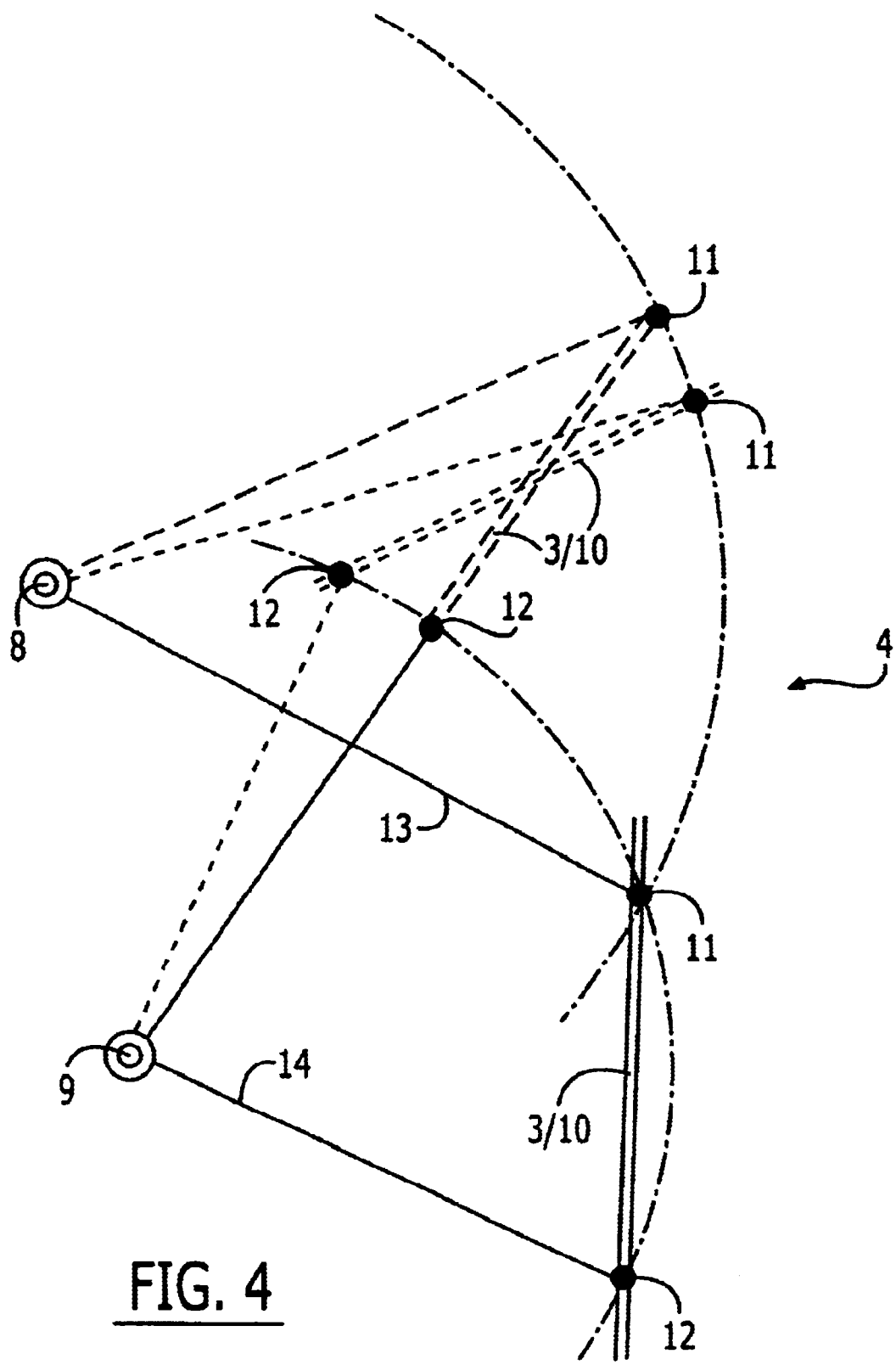
FIG. 4 is a schematic view of the four-bar linkage system used as the lifting/tilting guide.

When the frame 3 is arranged in the position illustrated in FIG. 1, a straight line passing, in side view of the bodywork, through the hinge pins 11 and 12 fixed on the bodywork and a straight line passing through the hinge pins 13 and 14 fixed on the frame form an upwardly open angle, the hinge pins 11 and 12 which are fixed on the frame arranged approximately vertically one above the other, cf. FIG. 4.

If the adjusting cylinder 15 is extended after the catches 5 are opened (cf. FIG. 1), the fitting arrangements 10, and therefore the frame 3, execute a virtually pure translatory movement upwardly in the vertical direction. With increasing height of lift, this translatory movement is combined with a pivoting movement in the clockwise direction.

If the adjusting cylinder 15 is extended further, the four-bar linkage systems 4 reach a position in which the hinge pins 11 and 12 fixed on the frame and the lower hinge pin 9 fixed on the bodywork are on a straight line. If the adjusting cylinder 15 is then extended somewhat still further, the frame 3 executes a virtually pure pivoting movement about a virtual pivot axis between the hinge pins 11 and 12 on the frame, the upper hinge pin 11 on the frame moving somewhat obliquely downwardly and it being possible for the lower hinge pin 12 on the frame to cross the connecting line between the two upper hinge pins 8 and 11, as is permitted by the angular or curved design of the upper link 13.

This enables that position of the supporting framework 2 which is raised and pivoted in the clockwise direction (illustrated in FIG. 2) to be reached, in which the front region of the rear cover 1 is extensively opened upwards, and the collapsible roof 7 may be retracted into the compartment 20 which may be closed by the rear cover 1 or may be moved out of this compartment 20.

If the adjusting cylinder 15 is subsequently retracted again, the frame 3 is returned into the position illustrated in FIG. 1 and fastened again by the catches 5.

Since the opening movement of the frame 3 and of the rear cover 1, which leads from the position illustrated FIG. 1 into the position illustrated FIG. 2, is configured as a lifting/tilting movement, the gap which is present between the edge of the rear cover 1 and adjacent, stationary parts of the bodywork is significantly widened before the actual pivoting movement of the rear cover 1 and of the frame 3 begins. This provides freedom in the configuration of the rear cover 1 and the remaining bodywork because bodywork parts adjacent to the rear cover 1 are virtually unable to act as an interfering contour during the pivoting movement of the rear cover 1.

The shape of the U-limbs 3', which is approximated to the L-shaped side view of the rear cover 1, may provide a configuration that in the frame 3 positions illustrated in FIGS. 1 and 3 there remains readily accessible and useable compartments 20 into which, for example, two golf bags 16 may be pushed below the U-limbs 3'. This significantly expands the compartment 20, which may be used on the side walls of the bodywork.

What is claimed is:

1. A supporting framework of a rear cover configured to be pivoted up about a front transverse axis and a rear transverse axis, of a rear compartment in a bodywork of a passenger vehicle having one of a fold-away roof and roof part, the rear compartment configured to be used to accommodate one of a roof and roof part and luggage, comprising:

a frame that is U-shaped in plan view and includes a central part orientated in a transverse direction and arranged on a rear of the bodywork, and U-limbs pivotable about the rear transverse axis;

rear-cover supporting parts arranged on the U-limbs and pivotable about the front transverse axis; and a lifting/tilting guide configured to retain the frame and to lift up the rear cover with respect to adjacent, stationary parts of the bodywork when the rear cover is first pivoted up about the rear transverse axis and during corresponding pivoting of the U-limbs, wherein the lifting/tilting guide includes a four-bar linkage system having two hinge pins parallel to the transverse axes on a stationary part of the bodywork, and two hinge pins parallel to the transverse axes on one of the frame and a part fixed on the frame, a first straight line passing in axial view through the hinge pins on the bodywork and a second straight line passing through the hinge pins on the frame form an upwardly open angle, the supporting framework further comprising:

a first link arranged between upper hinge pins;

a second link shorter than the first link arranged between lower hinge pins; and an adjusting assembly configured to subject the frame to a torque with respect to the two hinge pins on the frame.

2. The supporting framework according to claim 1, wherein the first link is configured as one of an angular and curved link having one of a downwardly open angle opening and a concave side.

3. The supporting framework according to claim 1, wherein the adjusting assembly is configured to engage on one of the frame and parts fixed on the frame in a vicinity of the hinge pins on the frame.

4. The supporting framework according to claim 1, wherein the adjusting assembly includes a single adjusting assembly.

* * * * *